METHOD AND APPARATUS FOR ENCAPSULATING DEVICES WITHIN A CERAMIC ASSEMBLY
Original Filed Jan. 12, 1967 5 Sheets-Sheet 1

INVENTORS
SHIGERU TSUJI
KAZUTAMI HAYASHI
KOUICHI KADOWAKI
KATSUO SATO
BY
OSTROLENK, FABER, GERB & SOFFEN
ATTORNEYS

INVENTORS
SHIGERU TSUJI
KAZUTAMI HAYASHI
BY KOUICHI KADOWAKI
KATSUO SATO
OSTROLENK, FABER, GERB & SOFFEN
ATTORNEYS

INVENTORS
SHIGERU TSUJI
KAZUTAMI HAYASHI
BY KOUICHI KADOWAKI
KATSUO SATO

OSTROLENK, FABER, GERB & SOFFEN
ATTORNEYS

INVENTORS
SHIGERU TSUJI
KAZUTAMI HAYASHI
KOUICHI KADOWAKI
KATSO SATO
BY
OSTROLENK, FABER, GERB & SOFFEN

INVENTORS
SHIGERU TSUJI
KAZUTAMI HAYASHI
BY KOUICHI KADOWAKI
KATSUO SATO

OSTROLENK, FABER, GERB & SOFFEN
ATTORNEYS

United States Patent Office 3,539,319
Patented Nov. 10, 1970

3,539,319

METHOD AND APPARATUS FOR ENCAPSULATING DEVICES WITHIN A CERAMIC ASSEMBLY

Shigeru Tsuji, Kazutami Hayashi, Kouichi Kadowaki, and Katsuo Sato, Tokyo, Japan, assignors to Nippon Electric Company, Limited, Tokyo, Japan Application Jan. 12, 1967, Ser. No. 608,885, now Patent No. 3,436,201, dated Apr. 1, 1969, which is a continuation-in-part of application Ser. No. 282,863, June 14, 1963. Divided and this application May 17, 1968, Ser. No. 766,336
Claims priority, application Japan, June 16, 1962, 37/25,188
Int. Cl. C03b *23/24;* C03c *27/02*
U.S. Cl. 65—43 5 Claims

ABSTRACT OF THE DISCLOSURE

Method and apparatus for encapsulating semiconductor devices. An apparatus for aligning mating encapsulating components relative to the semiconductor devices with connecting terminals extending therefrom applies light pressure to the mating encapsulating devices while passing the precisely aligned components through a heating zone including a conveyor belt or continuously passing such apparatus through an open-ended oven to seal the semiconductor devices within the encapsulating component.

This application is a division of application Ser. No. 608,885, filed Jan. 12, 1967, now Pat. No. 3,436,201, issued Apr. 1, 1969. U.S. Pat. No. 3,436,201 is a continuation-in-part of copending application Ser. No. 287,863, filed June 14, 1963, now U.S. Pat. No. 3,308,525 issued Mar. 14, 1967.

The instant invention relates to encapsulation devices, and more particularly to novel apparatus for hermetically sealing semiconductor components and the like with a ceramic assembly, which apparatus carries out a method that is well adapted to assembly line techniques.

Enginering technology in the field of electronics is making rapid strides in many technological areas within the broad scope of the electronics art. One very progressive area is that of miniaturization and even micro-miniaturization of electronic devices, as well as entire circuits. Active elements such as semiconductors and transistors, as well as passive elements such as capacitors, resistors and inductors are capable of being miniaturized to such a degree so that entire circuits comprised of a combination of the above mentioned elements may be formed in a single wafer or slab of material whose length, width and thickness dimensions may be of the order of millimeters or less.

Such devices which are commonly referred to as integrated circuits, have been found to yield excellent performance characteristics with the proviso that the devices be hermetically sealed within a housing so as to prevent deterioration and even destruction of the circuitry as a result of exposure to harmful external influences. Since the operating characteristics of present day miniaturized components have been found to be extremely sensitive to external conditions, it is important that these miniaturized circuit and/or components be capable of being hermetically encapasulated through the use of inexpensive and yet simple and reliable apparatus so as to yield an encapuslated assembly which is substantially insensitive to harmful external influences for an indefinite period of time.

One highly satisfactory means for encapsulating electronic devices is that of providing two mating metallic or ceramic members which may be glazed together by a suitable glass material placed along their mating surfaces which hermetically seal the electronic components contained within the members except for protruding leads projecting beyond the exterior of the housing members for connection into an electrical circuit.

It is very important to provide a glass sealing material which will not deteriorate or in any way contaminate the electronic components within the housing; which has a temperature coefficient of expansion quite close to that of the housing members, and which is capable of fusing at a low temperture level so as to be incapable of having any harmful effects upon the encapsulated electronic components.

The instant invention is characterized by providing an apparatus for glazing the housing components and for encapsulating miniature electron devices between mating components so glazed wherein the handling and assembling operations may be performed in a simple and high-speed (i.e., assembly line) manner.

It is, therefore, one object of the instant invention to provide novel apparatus for glazing housing bodies which are used for encapsulating miniature electronic devices and circuits.

Another object of the instant invention is to provide novel apparatus for enabling high-speed low-cost encapsulation of miniature electronic devices and circuits.

These and other objects of the instant invention will become apparent when reading the accompanying description and drawings in which:

FIG. 1 is a perspective view showing ceramic caps prior to the glazing operation.

FIG. 1*a* is a sectional view of one of the ceramic caps of FIG. 1.

FIG. 2 is a perspective view of a sorting machine for sorting the ceramic caps into various thickness ranges.

FIG. 2*a* is a top view of the sorting machine of FIG. 2.

FIG. 3 is a perspective view showing two jigs loaded with ceramic caps of the type shown in FIG. 1.

FIG. 3*a* is a sectional view of a portion of one jig shown in FIG. 3.

FIG. 4 is a perspective view showing the apparatus employed for glazing ceramic caps of the type shown in FIG. 1.

FIG. 4*a* is an elevational view showing the vacuum chuck portion of the apparatus of FIG. 4.

Figure 9:
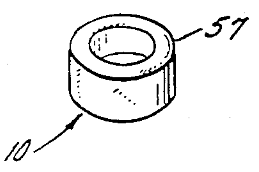
FIG. 9 is a perspective view showing a plurality of ceramic caps which have been glazed in accordance with the method steps depicted in FIGS. 2–8.
Figure 9A:
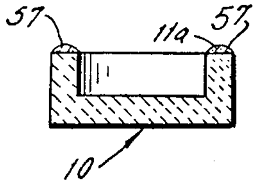

FIG. 9*a* is a sectional view of the ceramic cap shown in FIG. 9.

Figure 10:
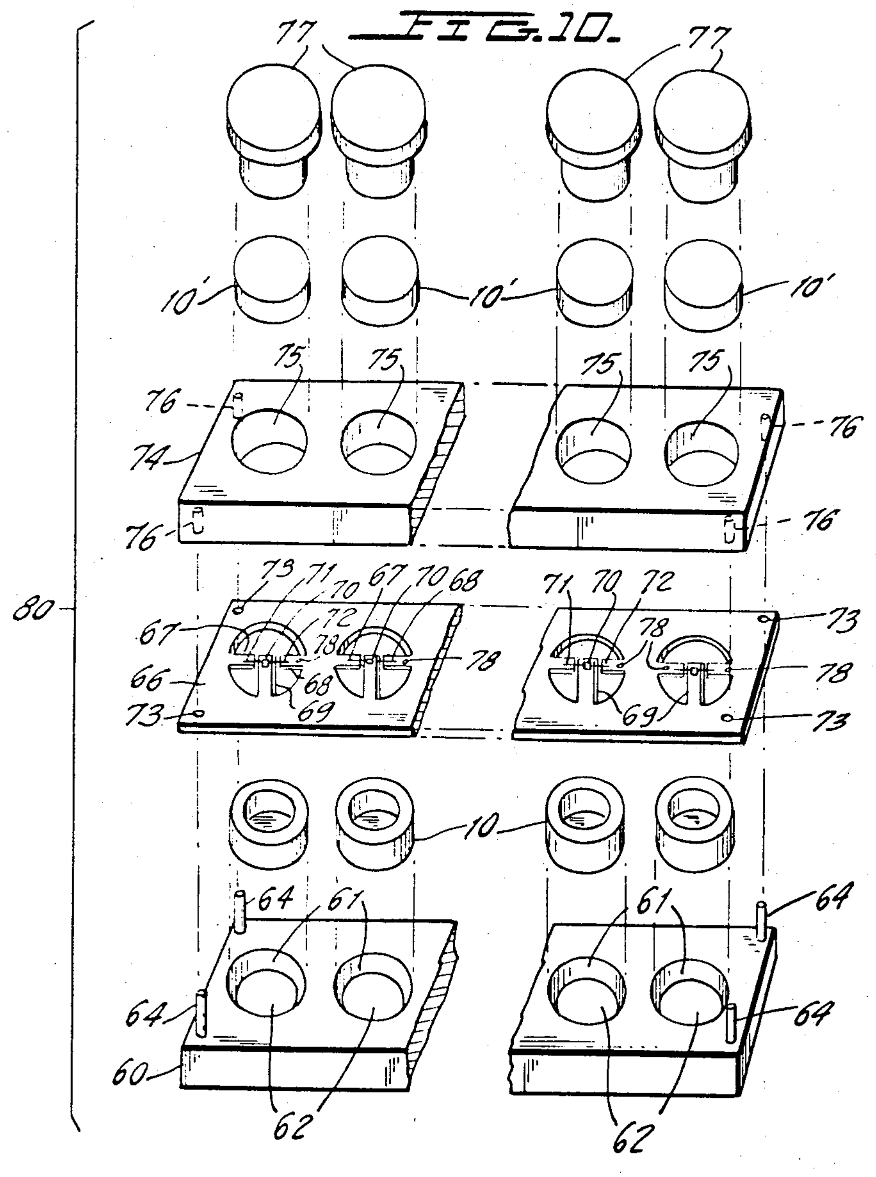

FIG. 10 is a perspective exploded view showing the jigs employed in the final encapsulation process.

Figure 10A:
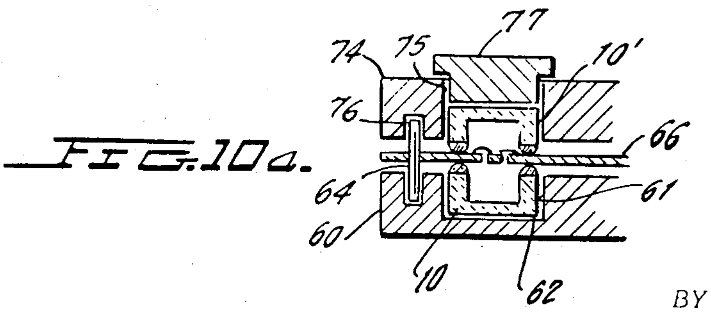

FIG. 10*a* is a sectional view of a portion of the jigs of FIG. 10, shown in the fully assembled position.

Figure 11:
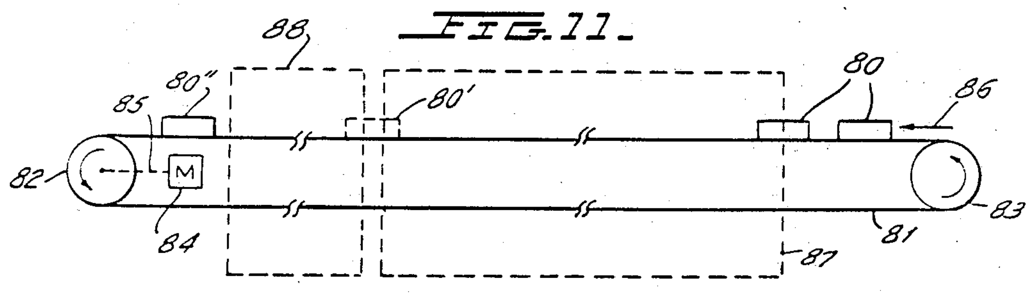

FIG. 11 is a diagrammatic view showing the manner in which the heating and cooling phases of the final encapsulation operation is performed.

Figure 12A:
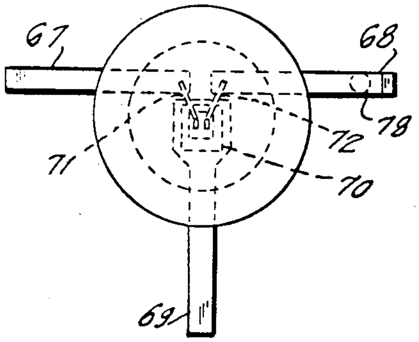
Figure 12:
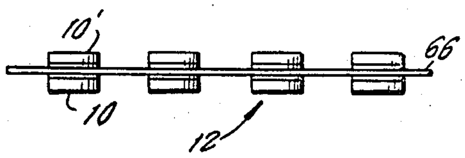

FIG. 12 is an end view of a completed encapsulated structure.

FIG. 12*a* shows a top view of the final structure of said process.

Figure 13A:
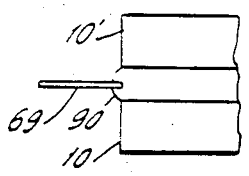
Figure 13B:
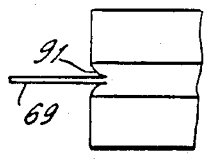
Figure 13C:
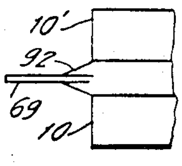

FIGS. 13*a*–13*c* are elevational views of a completed encapsulation assembly showing the manner in which a good hermetic seal along the glazed portion is determined.

Figure 14:
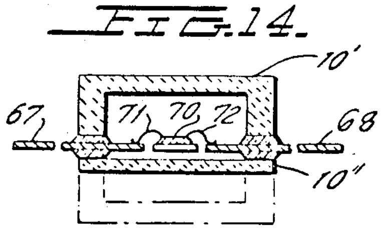

FIG. 14 is a sectional view showing a completed assembly.

Figure 15:
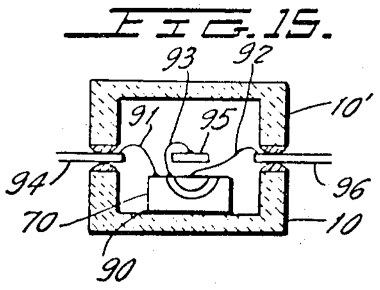

FIG. 15 is a sectional view showing an alternative completed assembly.

Figure 1:
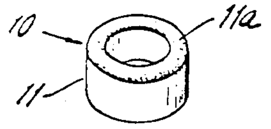
Figure 1A:
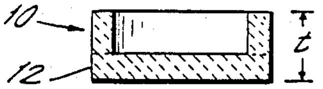

Referring now to the drawings; FIG. 1 shows a plurality of ceramic caps 10 each having a cylindrical portion 11 of relatively short height and a substantially disc-shaped member base portion 12, where the height of the overall cup-shaped member lies within a predetermined range of thickness $t$ (see FIG. 1*a*). The cap is formed of refractory insulating material such as a ceramic. Suitable ceramic materials which may be employed may be taken from the group consisting of steatite, alumina and forsterite.

The cap members 10 may be formed as unitary members or conversely may be formed through the operation of joining a disc-shaped member, such as 12, to a substantially ring-shaped member, such as member 11, by any suitable joining process. Preferably, however, the cup-shaped members are formed as unitary members and are not formed from two separate members, namely, a cylindrical shape and a disc-shaped member. However, such choice may, if desired, depend upon the needs of the user. In one preferred encapsulation procedure the three thickness ranges were:

$t_1$=0.55–0.60 millimeters;
$t_2$=0.60–0.65 millimeters;
$t_3$=0.65–0.70 millimeters.

Figure 2A:
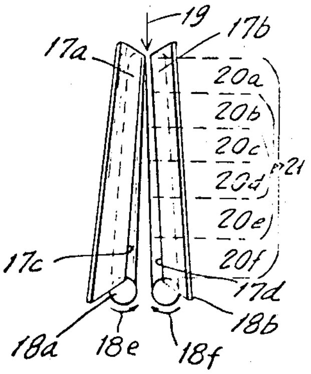
Figure 2:
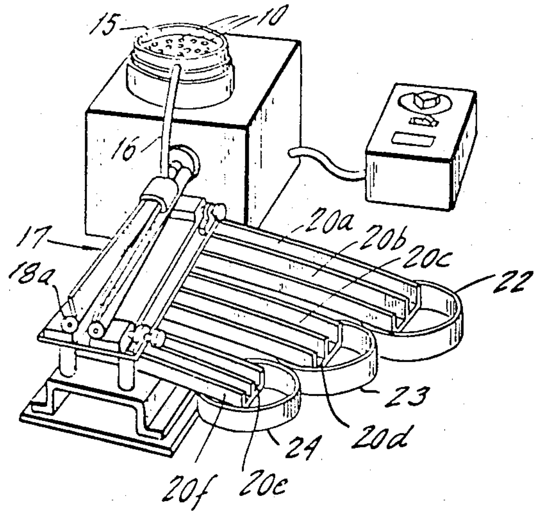

The sorting procedure is preferably carried out through automatic means such as that shown in FIGS. 2 and 2*a*, wherein a large number of ceramic caps are deposited into a hopper 15. A suitable vibrator mechanism (not shown) mounted beneath hopper 15 causes the caps to vibrate and through vibration, to pass through a suitable opening in hopper 15 and downwardly through tubing 16 so as to fall between two elongated flat members 17*a* and 17*b* arranged in inclined fashion so as to form a trough 17 which causes the ceramic caps to be fed toward the center region between the lower edges of members 17*a* and 17*b*. The respective lower edges are inclined toward one another at the feed end of the caps indicated in FIG. 2*a* by arrow 19. The opening is narrowest at the higher end and widens to the lower end relative to FIG. 2 so that the caps whose thicknesses are greater than the width of the opening at the higher end will continue to slide downwardly by gravity along the inclined trough until the opening is of suitable thickness to permit the caps to freely drop therebetween. Positioned immediately beneath the sides 17*a* and 17*b* of the trough are two elongated roller members 18*a* and 18*b* which are rotatably mounted by suitable means (not shown) and have their longitudinal axes substantially parallel to the lower edges of the associated sides 17*a* and 17*b*, respectively, so as to form the same tapered opening formed by the trough sides 17*a* and 17*b*. The roller members facilitate the dropping of the ceramic caps between the trough. The roller members are driven by a motor means (not shown) mounted within the housing located beneath hopper 15 which has its output shaft (not shown) mechanically coupled by means, not shown, to the elongated rollers causing them to rotate counterclockwise and clockwise, respectively, as shown by the arrows 18*e* and 18*f*, respectively. This rotating motion facilitates the alignment of the ceramic caps so as to further facilitate the dropping of the ceramic caps between the rollers into suitable inclined slides and selecting thickness ranges of ceramic caps. The inclines or slides 20*a*–20*f* are mounted immediately beneath the rollers and are each divided from one another by a plurality of partitions or walls 21. The caps being passed near the feed end and which drop through so as to slide down slides 20*a* and 20*b* would, for example, be those in thickness range $t_1$. In a similar fashion, the caps sliding down slides 20*c* and 20*d* would be in the thickness range $t_2$ while the final thickness range $t_3$ would be constituted by those caps sliding down slides 20*e* and 20*f*. As shown in FIG. 2, there is provided therein a glass or other clean receptacle 22–24 for each of the thickness ranges $t_1$–$t_3$, respectively.

The purpose for sorting the ceramic caps within predetermined thickness ranges is to guarantee uniform glazing of the caps. If the glazing of the caps was performed upon caps having thicknesses within a broad range, some caps would be well glazed whereas other caps may not be glazed at all. By suitably arranging the thicknesses, uniform glazing of all caps can thereby be readily and easily obtained.

Figures 3, 4A:
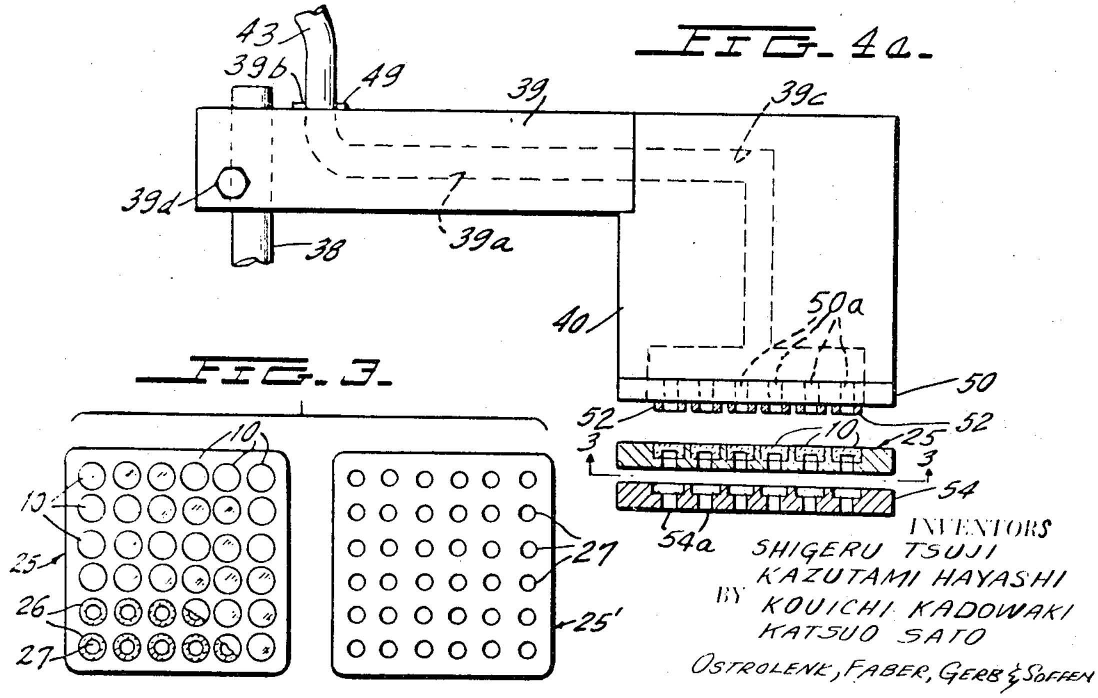
Figure 4:
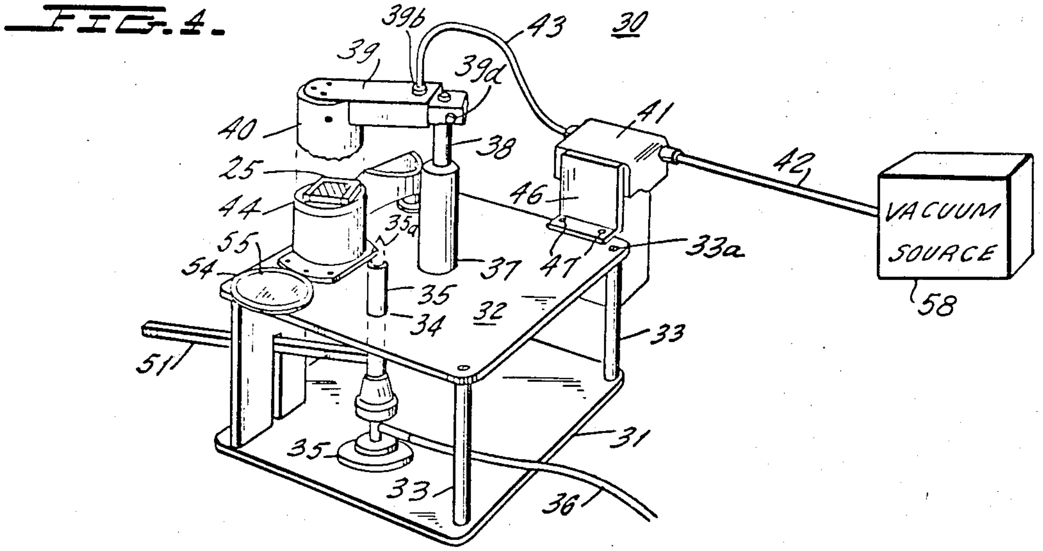
Figures 5, 6:
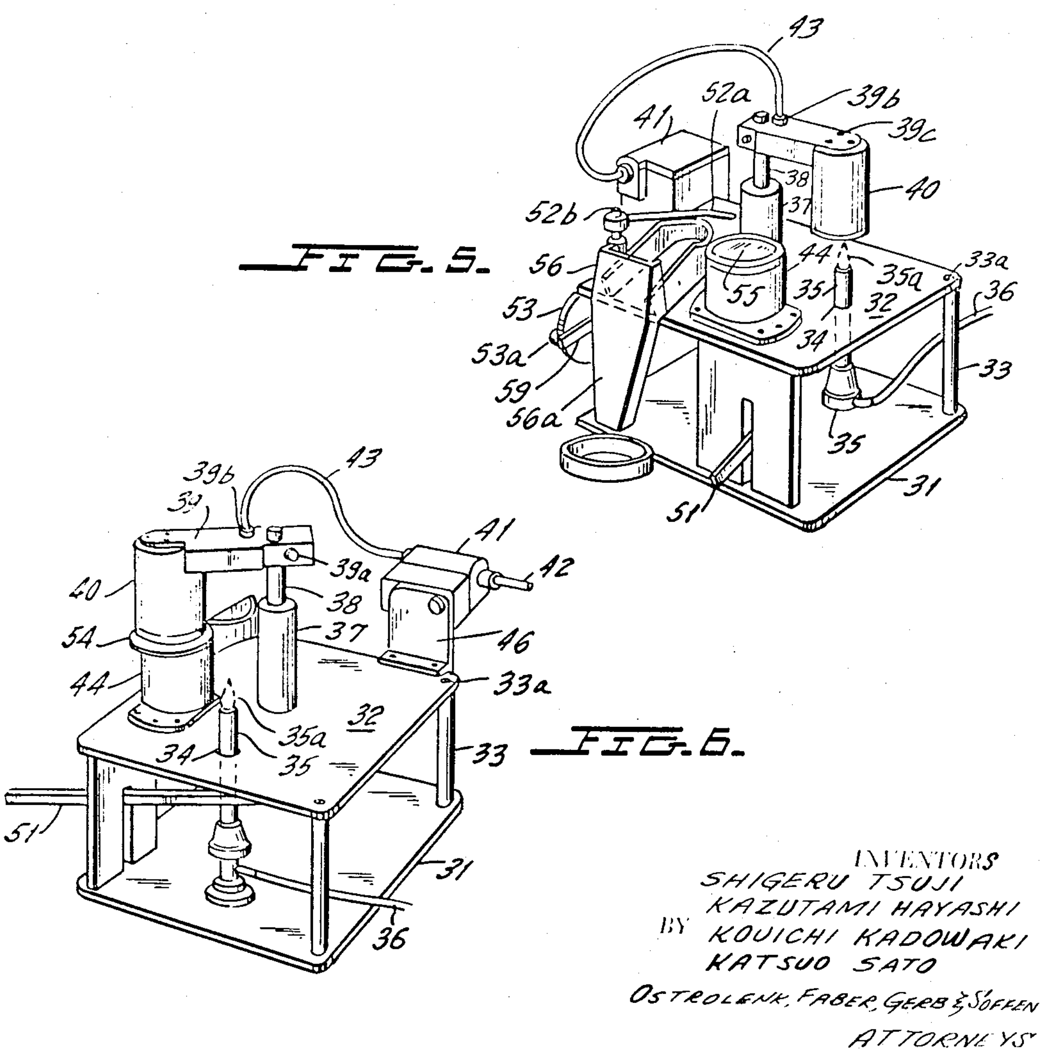
FIGS. 5–8 are perspective views of the glazing apparatus showing the various steps of the glazing operation.
Figure 7:
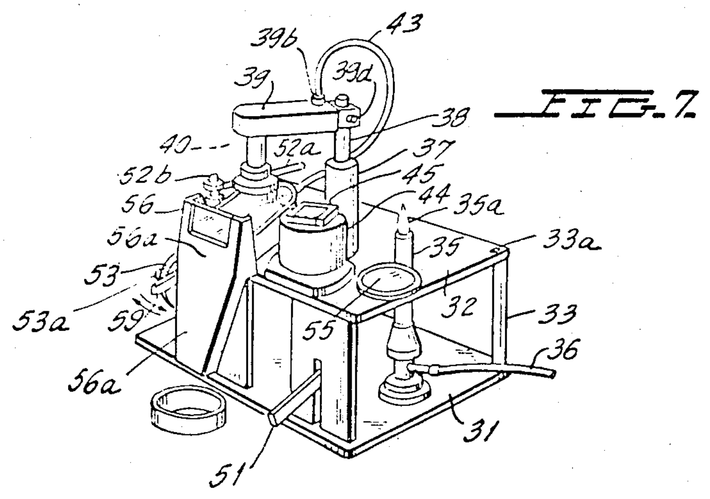
Figure 8:
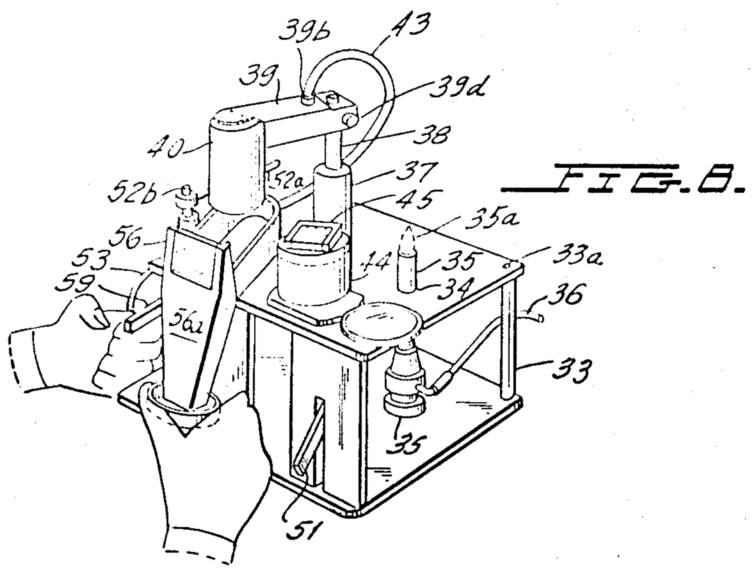

Each receptacle such as the receptacle 22 of sorted ceramic caps is now ready for the glazing operation. Preparatory to actual performance of the glazing operation, the caps of a receptacle are loaded into a jig 25, as shown in FIG. 3. The jig 25 is provided with a plurality of equal sized openings 26 arranged in a regular 6 x 6 matrix so as to be capable of receiving a total of 36 ceramic caps. It should be understood that whereas the jig shows a capacity for receiving 36 caps, any greater or lesser number is permissible, depending only upon the needs of the user and the actual capacity of the jig lends no novelty to the device of the instant invention.

Figure 3A:
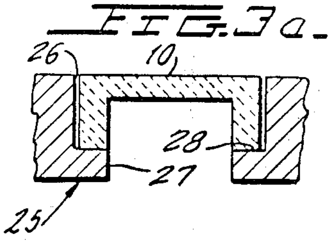

FIG. 3*a* shows a cross-sectional view of one of the openings provided in the jigs 25 and 25′, shown in FIG. 3. Jig, or carrier, 25, is shown with openings 26 containing the ceramic caps 10 which are mounted in a manner best seen in FIG. 3*a*. The underside of the jig 25 is shown in FIG. 3*a* by jig 25′ as having smaller diameter openings 27. Openings 26 and 27 form a shoulder 28 therebetween for supporting the ceramic caps. Caps of the same thickness range are loaded into a jig with the jig in the position shown as 25 in FIG. 3. It should be understood that the jig is shown in its overturned position 25′ only for purposes of clarity and that the jigs are not employed during the glazing process in this position, but are employed in a position as shown by jig 25 which is shown partially loaded with ceramic cap members positioned in the same manner shown in FIG. 3*a*.

FIGS. 4–8 are perspective views showing the glazing apparatus 30 which is comprised of a base plate 31 supporting a working surface plate 32 by spacers 33 secured between the two plates by suitable fastening means 33*a*. Plate 32 is provided with an opening 34 for receiving the upper end of a heating source such as, for example, a Bunsen burner 35 whose flame appears at 34*a* and which is connected to a gas source by means of supply tube 36.

An elongated cylinder 37 is rigidly secured to plate 32 and is provided with a centrally located opening for receiving rod 38 which is both reciprocally and rotatably movable relative to cylinder 37 by operating handle 53. A support arm 39 is provided with an aperture for receiving the upper end of rod 38 is rigidly clamped thereto by fastening means 39*d*.

A vacuum source 58 is coupled to a drain means 41 secured to plate 32 by bracket 46 and fastening means 47. The outlet port of the drain means 41 is coupled through tubing 43 to an inlet port 39*b* provided in arm 39. Arm 39 and depending cylindrical shaped member 40, fastened to arm 39 by suitable fastening means (not shown), form the vacuum chuck which operates in a manner to be more fully described.

Referring to FIG. 4*a*, the internal construction of members 39 and 40, forming the vacuum chuck, can be seen to be comprised of the vacuum tubing 43 secured by suitable fastening means 49 to opening 39*b*. The opening 39*b* is the entry to a conduit 39*a* formed internally of the arm 39 thereby coupling the vacuum tubing 43 to a vertically aligned cavity 39*c*. This cavity is appreciably enlarged at its lower end to communicate with a plurality of slender conduits 50*a* arranged in disc 50 in a regular matrix fashion in the same array as the array of openings provided in the jig or carrier 25, shown in FIG. 3. The steps in the operation of glazing ceramic caps are as follows:

The working surface plate 32 (see FIG. 4) is provided with a cylindrical shaped pedestal 44 whose upper surface is provided with an aligning means 45 for accurately positioning a ceramic cap carrier 25. The aligning means may, for example, be a three-sided guide so as to properly align a loaded jig 25 within the alignment means in order to insure that the array of ceramic caps are in substantially exact alignment with the array of small openings 50*a* provided in the vacuum chuck means (see FIG. 4*a*). A hand-operated lever 51 extending from the front of the apparatus is moved vertically downward causing the vacuum chuck and apparatus (arm 39 and cylinder 40) to be moved vertically downward so as to be positioned immediately above the carrier means. Each of the small diameter conduits 50*a* (see FIG. 4*a*) is provided with a resilient member such as, for example, a resilient O-ring 52 at its lower opening which bears upon the surface of an associated ceramic cap 10 so as to make substantially firm surface contact therewith.

A second manually operable lever 52 which moves in a horizontal plane is moved in a first direction within such horizontal plane, opening drain means 41 and thereby allowing vacuum source 58 to be directly coupled through tubing 42, drain means 41, tubing 43 and the internal conduits within members 39 and 40 so as to reach the small diameter conduits 50*a* and thereby cause the ceramic caps to be firmly held by the vacuum against an associated resilient member or O-ring 52.

With the vacuum chuck in the operative position, lever 51 is now moved vertically downward causing the ceramic caps to be drawn upwardly and out of the openings 26 provided in their associated carrier 25 so that the ceramic caps are lifted with the subsequent lifting of the vacuum chuck.

The vacuum chuck, which now holds all of the ceramic caps which have been removed from the carrier 25, is then moved to a position immediately above the flame of Bunsen burner 35 so as to be heated by flame 35*a*. The movement of vacuum chuck from above the pedestal 44 to the position above the Bunsen burner 34 is performed by operating the rotatably mounted handle 53*a* secured to a substantially disc-shaped member 53 which, in turn, is secured to a shaft (not shown) and suitable linkage (not shown) for moving the vacuum chuck from station-to-station.

The empty carrier member 25 is then removed from pedestal 44 and replaced with a shallow dish 54 containing a glass powder arranged at a uniform thickness throughout the dish. This may be very easily carried out simply by depositing the glass powder within the shallow dish and then running a straight-edge or other suitable tool across the upper lip of the dish so as to smooth out the glass powder provided within the shallow dish. The depth of the glass powder is preferably less than 7 millimeters.

The glass powder employed may be anyone of the types of materials described in copending U.S. patent applications Ser. No. 206,098, filed July 18, 1963 (now abandoned), Ser. No. 329,854, filed Dec. 11, 1963 now U.S. Pat. No. 3,420,683 issued Jan. 7, 1969 and Ser. No. 554,-803, filed June 2, 1966, now abandoned.

Since the specific characteristics of the glass are all set forth in great detail in the above mentioned copending applications, no specific compositions will be recited herein for purposes of simplicity, but it should be understood that the glass powder employed contains no binders or solvents since such constituents which will evaporate during the encapsulation process may be captured within the interior of the encapsulated housing and cause severe damage to the sensitive microcircuits contained therein. Also, the glass powder should be of a composition which has a substantially low softening point to enable the glazing as well as the encapsulation operation to be performed at low temperatures preferably well below 400° C. in order to avoid any damaging effects upon the encapsulated microcircuitry.

After the ceramic caps are heated to a sufficient temperature level, the vacuum chuck is moved by handle 53*a* to a position immediately above pedestal 44. The chuck is then lowered by moving operating lever 51 downward causing the vacuum chuck to move downwardly toward pedestal 44 upon which a shallow receptacle 54 containing glass powder 55 is positioned in a manner which can best be seen in FIGS. 5 and 6. The downward movement of operating handle 21 causes the ceramic caps which are held in position against the vacuum chuck by the vacuum to be urged under pressure into the glass powder 55. The heating phase is maintained for a time interval sufficient to heat the ceramic caps to a temperature level in the range from 400° C. to 800° C. and preferably at a temperature level of 500° C. The ceramic caps are maintained in surface contact with the glass powder for a time interval in the range from 0.5 seconds to 3 seconds. During this period of time the combined pressure and heat causes the glass powder to be fused so as to become glazed to the surfaces 11*a* (see FIG. 1) of the vacuum-held ceramic caps.

After the glazing operation is completed, lever 51 is moved upwardly causing the vacuum chuck to be moved upwardly and away from the glass powder 55. After the vacuum chuck has been lifted upwardly and away from the glass powder, the vacuum chuck is now moved by rotation of handle 53*a* to the position shown in FIG. 7 so that it is immediately positioned above gravity feed bin 56. Once the vaccum chuck is positioned above the gravity feed bin 56 it is maintained in this position for a period in the range from 20 seconds to 2 minutes in order to allow the ceramic caps to cool. After the cooling interval is completed, manually operable lever 52 is moved in a horizontal plane in a direction away from bin 56 causing the drain means 41 to disconnect the vacuum source 58 from the vacuum chuck. The movement of operating lever 52 in the above mentioned direction also causes a lever 52*a* which is coupled through a shaft 52*b* to rotate with lever 52, to move in a horizontal plane immediately beneath the O-rings 52 (see FIG. 4*a*) so as to sweep the brush off the ceramic caps from the vacuum chuck assembly causing them to be dropped by gravity into the gravity feed bin 56 and downwardly through its inclined chute 56*a* into a clean glass receptacle in the manner shown in FIG. 8, thereby producing glazed ceramic caps shown in FIG. 9 in readiness for the next phase of the encapsulation operation. FIG. 9*a* shows a sectionalized view of one ceramic cap 10 showing the glazed portions 57 which have been fused to the surface 11*a* of the cap.

Having described the glazing operation, the final encapsulation operation is performed in the following manner:

FIG. 10 shows an exploded view of the jig assemblies employed in the final encapsulation process.

A jig or carrier member 60 comprised of an elongated metallic plate having a plurality of apertures 61 is loaded with ceramic caps 10, in a manner which can best be seen from a consideration of FIG. 10*a*. The base of each opening 61 forms a seat for supporting upon the exterior surface of an associated ceramic cap 10. Whereas the jig 60 is shown in broken fashion, it should be understood that a large plurality such as 10 or 20 of the ceramic caps may be loaded into the jig which is provided with a corresponding number of openings therefore.

The jig is provided with a plurality of upwardly projecting pins 64 arranged at the corners thereof for keying purposes, to be more fully described.

The exemplary embodiment of FIG. 10 shows a metallic plate 66 having a plurality of openings each containing three inwardly projecting fingers 67–69 which eventually form the electrode leads for a semiconductor device 70. The semiconductor device 70 which may, for example, be a diffused type transistor element mechanically and electrically secured to lead 69 which may be identified as the collector lead. The remaining leads 67 and 68 are connected to suitable points upon the upper surface of the transistor device by gold leads (for example) 71 and 72, respectively. Whereas the plate 66 is shown in partially broken fashion, it should be understood that its length is substantially equal to the jig 60 and that the openings are spaced at intervals substantially equal to the spaced intervals of the ceramic caps 10 provided in the base jig 60.

Plate 66 is provided with a plurality of openings 73 at the corners thereof to allow for simple straightforward alignment with the base carrier member 60. Plate 66 is positioned upon carrier 60 with pins 64 projecting through the opening 73.

An upper jig 74, preferably comprised of an elongated metallic plate having a plurality of openings 75 is positioned upon plate 66. Jig 74 is likewise keyed to the assembly by means of the openings 76 provided near the four corners thereof and which are designed to receive the projecting pins 64 which extend through the openings 73 in plate 66 and the openings 76 in jig 74. The openings 75 are arranged at spaced intervals equal to the spacing of the semiconductor devices and the spacing of the apertures 61 in jig 60.

The glazed ceramic caps 10′ are then loaded into the openings 75 oriented in the manner shown in FIG. 10*a*. The caps such as, for example, the caps 10 and 10′, as shown in FIG. 10*a*, are arranged with their cylindrical portions facing one another so as to eventually form an enclosed housing for the semiconductor device. After the loading of the ceramic caps 10′ is completed, a plurality of substantially circular shaped weights 77 are placed within each opening 75 so as to bear upon the upper surface of the glazed ceramic caps 10′, in the manner shown in FIG. 10*a*. The weights are chosen so as to provide a suitable amount of pressure against the ceramic caps 10 and 10′ during the encapsulation operation so as to insure a good hermetic seal.

Whereas the embodiment of FIG. 10 shows the encapsulation of a single semiconductor device such as a transistor, it should be understood that the encapsulation operation may be performed in a substantially identical manner for other devices or for integrated circuits as the case may be. Also, whereas the embodiment shown in FIG. 10 employs circular shaped ceramic caps, it should be understood that the caps may be square shaped, rectangular shaped or have any other shape which may be dictated by the configuration of the circuit components to be encapsulated.

In order to facilitate the identification of the electrode leads 67–69, one of those leads such as, for example, the leads 67 or 68 may be color coated with a colored dot 78 to easily and readily identify this lead as the base or emitter lead.

After each of the assemblies 80, shown in FIGS. 10 and 10*a*, are completed, they are then loaded upon a conveyor belt 81 as shown in FIG. 11. The conveyor belt is wound about first and second rollers 82 and 83. Roller 82 is mechanically coupled to motor means 84 through suitable mechanical linkage such as gears or the like, designated by dotted line 85. The motor means 84 is adjustable so as to permit adjustments in the rate of travel of the conveyor belt 81. Roller 83 is rotatably mounted in such a manner as to freely rotate with the movement of the conveyor belt.

The assemblies 80 are loaded at the right-hand end of the conveyor belt and move in the direction shown by arrow 86 under control of the motor means 84. Moving from the right toward the left, the assemblies 80 enter into an oven or other suitable heating source 87 which subjects the assemblies to temperatures preferably in the range from 300°–400° and in any case, usually less than 400° so as to prevent any damage to the rather sensitive electronic circuits and/or devices. This low temperature, while insufficient to cause any damage to the electronic components and/or circuits, is nevertheless sufficient to cause fusion of the glazed surfaces in order to produce a hermetically sealed encapsulated device. The length of the oven, the temperature range and the rate of travel of the conveyor belt may all be adjusted in order to obtain optimum fusing conditions. In one preferred embodiment, the oven is comprised of a heating source which maintains a temperature within the enclosure and over substantially its entire length of 390° with the exception of the entrance to the oven. The rate of travel of the conveyor belt in one preferred embodiment for performing the sealing operation is adjusted to cause the assemblies to remain within the oven 87 for a period within the range from 5–15 minutes.

As the assemblies, such as for example assembly 80; leaves the heating station 37 it enters into a cooling station 88 which is provided with suitable water cooling means, fans or other blower means for cooling the completed encapsulations. It should be understood that the conveyor belt arrangement is of sufficient length and travels at a rate which is suitable to permit removal of the fused and cooled assembly such as, for example, the assembly 80″ from the left-hand end of the conveyor belt.

After completion of the fusing and cooling operation, the completed structures are removed from the jigs 60 and 74 and are in the form shown in FIG. 12. The completed structures of FIG. 12 are eventually subjected to a stamping operation wherein the individual encapsulations are stamped away from plate 66 so that each individual structure has the appearance shown in FIG. 12*a*.

After completion of the encapsulation operation the individual structures are inspected, preferably under a microscope or other optical magnification means to determine whether an adequate seal has been obtained. FIGS. 13*a*–13*c*, which show portions of a completed assembly. indicate the exterior conditions which are found to occur when either a good or poor seal is obtained. FIG. 13*a* shows a device in which a good seal has been obtained. In this case there is just a slight bulge 90 of the fused glass projecting beyond the vertical sides of the cap members 10 and 10′ in the region of lead 69. This indicates that the temperature level is sufficient for producing an adequate seal.

FIG. 13*b* shows the fused glass as having a slight indentation in the region of the electrode (69, for example) which is an indication that the temperature level in the heating cycle is too low and that an adjustment is required.

FIG. 13*c* shows the fused glass projecting substantially beyond the vertical surfaces of the ceramic caps 10 and 10′ in the region 92 adjacent an electrode (69, for example) which is an indication that the temperature level in the heating cycle of FIG. 11 is too high and that a suitable adjustment is required. This inspection operation may be more advantageously performed before the individual structures are stamped from the plate 66 in order to greatly faciltate the handling operation.

The color coating 78 of the electrodes may be damaged during the heating process so that it is alternatively suggested that the color coating be performed after the inspection operation detailed above and in any case, after the heating operation. If desired, more than one of the electrodes projecting from the caps 10 and 10′ may be color coated, depending only upon the needs of the user. Obviously, any variety of colors may be employed for color coating of the electrodes.

After all the above operations have been performed, inclunding the stamping operation, a leak test is performed to determine whether the encapsulating assembly leaks. The performance of this test is comprised of the steps of immersing each of the individual structures into a suitable solution for effecting the leak test. One preferred solution presently available is sold under the trademark name "Red Check".

The individual structures are then removed from this solution after being immersed therein for a period preferably in the range from 15 minutes to 2 hours. When in the solution, the structures are placed under a suitable pressure. The pressure range is preferably from 1 to 6 atmospheres with the preferred level being approximately 4 atmospheres.

The individual structures are then removed from the elevated pressure medium and thoroughly washed in a solution of trichlorethylene. Those structures which exhibit a red color are clearly indicated as defective structures. The remaining structures which have successfully passed the leak test are then sorted in accordance with their electronic characteristics in the manner described in issued Pat. No. 3,171,187, for the subsequent handling, shipping and use by the ultimate user.

FIG. 14 shows a sectionalized view of a completed structure. Whereas the completed structure shown therein is comprised of two cap members, it should be understood that the lower cap member may be replaced by a disc member 10″ and described in detail in issued Pat. No. 3,171,187 and in copending application Ser. No. 287,863, both previously mentioned above.

In the case where it is desired to glaze a disc member near its marginal periphery to enable it to be encapsulated with a cap member, the shallow dish containing the glass powder may be provided with a multiplicity of openings 54*a* (see FIG. 4*a*) arranged in a regular matrix substantially identical to the arrangement of the cap members 10 in the jig 25. This arrangement causes the glass powder to drop through the matrix of openings enabling only the marginal peripheries of the disc members to be so glazed. A more detailed and enlarged showing of this arrangement is depicted in FIG. 2 of copending application Ser. No. 287,863.

Whereas the entire assembly is shown arranged in a suspended fashion relative to its enclosing members, it is also possible to secure the assembly to the base member 10 (or disc 10″) through the use of a cement or adhesive material such as, for example, low melting glasses or silver conductivity paints to secure the structure thereto. In the case where the structure is adhered to the member 10 (or 10″) it is also possible to use a low melting point glass having substantially the same coefficient of expansion as the ceramic material to provide good securement of the device to the member 10 (or 10″).

In the case where the semiconductor structure is suspended in the manner shown in FIG. 14, the leads 67–69 are formed of a material having sufficient resiliency so as to absorb any impact suffered by the structure while at the same time having sufficient rigidity to prevent the structure from colliding with the interior surfaces of either of the encapsulation members 10′ or 10. In the case where the structure is adhered to the lower member 10 (or 10″) the cement or low melting point glass which is employed to adhere the structure to the base member prevents any collisions between the housing members (i.e., caps) and the structure itself by rigidly adhering the structure to its associated base member.

FIG. 15 shows a completed structure wherein the semiconductor wafer 70 is adhered to the base of a ceramic cap 10 by a suitable cement 90 and wherein all of the gold leads 91–93 are electrically connected to the top surface of the transistor device. These gold leads are, in turn, electrically connected and rigidly bonded to leads 94–96, respectively, which project outwardly from the encapsulating members 10 and 10′. The advantage of the embodiment of FIG. 15 is such that, if any of the gold leads 91–93 were to droop, there is a possibility that they can make electrical contact with one another and thereby short circuit the transistor.

It can be seen from the foregoing that the instant invention provides a novel assembly line technique for glazing ceramic members and encapsulating miniaturized electrical components to provide an excellent hermetically sealed device capable of maintaining good operating characteristics for an indefinite period of time.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. A method for encapsulating electronic devices comprising the steps of:

(a) providing a plurality of cup-shaped ceramic members each having a glass glazed mating surface;

(b) placing one of said electronic devices between a pair of said cup-shaped ceramic members so that the leads of said electronic device extend between the mating edges of said cup-shaped ceramic members and beyond the periphery thereof, so as to form a composite assembly;

(c) applying slight pressure to said assembly to urge the mating surfaces of said assembly toward one another;

(d) passing said assembly through a region of elevated temperature for a period sufficient to cause said glazed surfaces to fuse together and thereby seal the electronic device within said cup-shaped ceramic members.

2. The method of claim 1, wherein step (d) further comprises the step of controlling the temperature level of said elevated temperature region so as to be sufficient to cause fusion of said glazed surfaces and insufficient to have a harmful effect upon the electronic device.

3. The method of claim 2, wherein said temperature level lies within the range from 200° C. to 400° C.

4. Apparatus for use in aligning a plurality of electronic devices and encapsulating members comprising:

a flat metallic sheet having a plurality of large openings arranged at spaced intervals along said sheet; each of said openings having a portion projecting from the periphery of the opening toward the center thereof for supporting an electronic device substantially at the center of each of said large openings;

a first jig member having a plurality of shallow cavities arranged at spaced intervals and each being adapted to receive an encapsulating member;

plural pin means arranged at spaced intervals along said first jig member, each of said pin means projecting upwardly from the top surface of said first jig member;

said flat metallic sheet having a second plurality of small openings arranged at spaced intervals along said flat metallic sheet and each being aligned with an associated one of said pin means for facilitating alignment of each large opening with an associated cavity in said first jig member when said flat metallic sheet is placed upon said first jig member;

a second jig member having a first plurality of openings arranged at spaced intervals, each being adapted to receive an encapsulating member therein;

a second group of small openings being provided in said second jig member, each of said small openings being adapted to receive an associated one of said pin means for automatically aligning each opening of the first plurality of openings in said second jig member with an associated one of said large openings in said flat metallic sheet when said second jig member is positioned upon said flat metallic sheet;

a plurality of weights each being positioned in an associated one of said first plurality of openings in said second jig member and being adapted to urge associated encapsulating members toward one another.

5. Means for encapsulating semiconductor devices comprising:

a conveyor belt movable in a first direction;

heating means including an enclosure open at first and second ends thereof;

said conveyor belt passing through said first and second ends so as to move through the heating region contained within said enclosure;

at least one aligning apparatus for aligning a plurality of electronic devices and encapsulating members being positioned upon said conveyor belt so as to be carried through said heating means;

said aligning apparatus being comprised of:

a flat metallic sheet having a plurality of large openings arranged at spaced intervals along said sheet, each of said openings having a portion projecting from the periphery of the opening toward the center thereof for supporting an electronic device substantially at the center of each of said large openings;

a first jig member having a plurality of shallow cavities arranged at spaced intervals and each being adapted to receive an encapsulating member;

plural pin means arranged at spaced intervals along said first jig member, each of said pin means projecting upwardly from the top surface of said first jig member;

said flat metallic sheet having a second plurality of small openings arranged at spaced intervals along said flat metallic sheet and each being aligned with an associated one of said pin means for facilitating alignment of each large opening with an associated cavity in said first jig member when said flat metallic sheet is placed upon said first jig member;

a second jig member having a first plurality of openings arranged at spaced intervals, each being adapted to receive an encapsulating member therein;

a second group of small openings being provided in said second jig member, each of said small openings being adapted to receive an associated one of said pin means for automatically aligning each opening of the first plurality of openings in said second jig member with an associated one of said large openings in said flat metallic sheet when said second jig member is positioned upon said flat metallic sheet;

a plurality of weights each being positioned in an associated one of said first plurality of openings in said second jig member and being adapted to urge associated encapsulating members toward one another;

said first and second enclosure openings each being of a size sufficient to allow said conveyor belt and said aligning apparatus to pass therethrough;

cooling means positioned adjacent the second end of said heating means for cooling said assemblies as they pass beyond the second end of said heating means.

References Cited

UNITED STATES PATENTS

| | | | |
|---|---|---|---|
| 2,301,940 | 11/1942 | Fries | 65—43 X |
| 3,310,392 | 3/1967 | Rhodes | 65—155 X |

ARTHUR D. KELLOGG, Primary Examiner

U.S. Cl. X.R.

65—58, 60, 155; 29—588, 589